Patented Sept. 15, 1931

1,823,026

UNITED STATES PATENT OFFICE

EDGAR C. BRITTON, WILLIAM H. WILLIAMS, AND MARK E. PUTNAM, OF MIDLAND, MICHIGAN, ASSIGNORS TO THE DOW CHEMICAL COMPANY, OF MIDLAND, MICHIGAN, A CORPORATION OF MICHIGAN

PURIFICATION OF ARYLAMINES

No Drawing.  Application filed February 21, 1929.  Serial No. 341,828.

In the method of making a primary arylamine wherein a mono-halogenated aromatic hydrocarbon is reacted with aqueous ammonia solution at an elevated temperature and pressure and in the presence of a copper compound as catalyst, the resulting reaction product separates upon standing into an aqueous layer containing chiefly ammonia, ammonium chloride and copper salt in solution, and an oily layer consisting chiefly of the primary arylamine product and a lesser amount of the corresponding phenolic compound, together with relatively small amounts of the corresponding secondary amine, diarylether and other compounds. The oil layer also contains traces of water, ammonium salts and copper compounds. Such oil layer is separated from the aqueous layer and treated for the purification of the primary arylamine product. The latter procedure involves numerous practical difficulties, arising principally from the persistency with which the phenolic compound frequently accompanies the primary arylamine through the various purification steps.

For example in the manufacture of aniline by reacting between chlorbenzene and aqueous ammonia solution with a cuprous compound as catalyst, the oil layer so obtained contains, in addition to aniline, from 3 to 8 per cent of phenol, along with smaller amounts of diphenylamine, diphenyl oxide, copper and ammonia compounds. In purifying this product the complete separation of phenol presents considerable difficulty.

The formation of such phenol is unavoidably connected with the aforesaid process, being due to the hydrolytic action of water present. While in practice hydrolysis is largely restrained by providing a large excess of ammonia, nevertheless a certain condition of equilibrium between the reacting components exists, such that a definite modicum of phenol is always produced. A procedure for effecting a substantially quantitative separation of such phenol from the aniline is essential for obtaining a pure water white product that is permanent and will remain for a long period without material discoloration. To the accomplishment of the foregoing and related ends the invention, then, consists of the steps hereinafter fully described and particularly pointed out in the claims, the following description setting forth in detail certain procedure whereby the principle of the invention may be used.

As previously stated, the reaction mixture derived from the aforementioned process for the manufacture of an arylamine, e. g. aniline, separates upon standing into an aqueous and an oily layer, the former containing excess ammonia, and soluble ammonia and copper compounds together with small amounts of aniline and phenol in solution, while the latter consists of the bulk of the crude aniline product together with unreacted chlorbenzene and organic impurities such as phenol, diphenylamine, diphenyl oxide, etc., as well as traces of ammonia and copper compounds. On boiling the aqueous layer the aniline and phenol content thereof is steamed out, collected by suitable means and added to the oily layer.

The oily layer is treated with an aqueous caustic alkali solution, e. g. caustic soda, in quantity sufficient to neutralize and fix the phenol, break up the ammonia compounds and precipitate the copper compounds. The mixture is thereupon distilled, conveniently at atmospheric pressure, to drive off, first, ammonia and then all of the water. A small amount of chlorbenzene and aniline is carried over with the steam and is recovered from the distillate, being returned either to the initial reaction or to the main body of crude aniline remaining in the still, depending upon the proportions of chlorbenzene and aniline contained therein.

Such main body of crude aniline is now substantially anhydrous, the phenol content thereof being present as dry alkali phenate, together with a slight excess of caustic alkali. The mixture is distilled, preferably under reduced pressure, e. g. at about 23 to 27 inches vacuum. The first fraction coming over contains the chlorbenzene, this being returned to the original reaction. Pure aniline then distills over as a clear water-white product. When distillation is completed a heavy, semi-solid residue is left in the still, such residue containing alkali phenate, diphenylamine, diphenyl oxide, copper compounds and tarry decomposition products. Water is then added to the still to dissolve up such phenate, and the aqueous mixture is distilled to drive off small amounts of residual aniline retained therein, the latter being slightly impure and therefore preferably being added to a succeeding charge to the still. The still contents are then drained off and filtered to separate the insoluble sludge from the clear solution of phenate. The copper-containing sludge may be returned to the original reaction for the purpose of supplying part of the cuprous compound as catalyst therein. The phenate solution may be acidified to liberate phenol and the latter separated and purified in the usual way.

The efficacy of the foregoing method for purifying the crude aniline product and separating it from accompanying phenol is believed to lie, at least in large part, in transforming such phenol into a metallic phenate substantially non-hydrolyzed under the conditions of operation, thereby permitting complete separation of water from the crude material without material decomposition or hydrolysis taking place therein. Examples of such relatively non-hydrolyzed metallic phenates are the phenates of the alkali metals and barium. On the other hand calcium phenate, for example, is readily hydrolyzed in the presence of water, hence the present procedure cannot be employed therewith. After the preliminary separation of water and fixation of phenol, the aniline product may be distilled from the anhydrous mixture and recovered in a state of exceptional purity, the purified product being markedly superior to that heretofore obtainable by other methods. Furthermore residual raw materials and by-products are recovered, losses of the values contained therein being almost negligible.

By analogous procedure the crude arylamine product from the reaction between a halogenated aromatic hydrocarbon and aqueous ammonia, generally, with or without the use of a catalyst, may be most advantageously worked up and purified. The herein described method is likewise equally adapted for separating and purifying mixtures of arylamines and phenols, generally, however derived.

This application is a continuation in part of our application Serial No. 147,178 for "processes of separating aniline and phenol", filed November 8, 1926.

Other modes of applying the principle of our invention may be employed instead of the one explained, change being made as regards the method herein disclosed, provided the steps or steps stated by any of the following claims or the equivalent of such stated step or steps be employed.

We therefore particularly point out and distinctly claim as our invention:—

1. In a method of purifying the crude arylamine product of a reaction between a halogenated aromatic hydrocarbon and aqueous ammonia solution, said product also containing a relatively small amount of a phenolic compound, the steps which consist in converting said phenolic compound into a substantially non-hydrolyzable metallic phenate, removing water therefrom and separating said arylamine by distillation from the resulting anhydrous mixture.

2. In a method of purifying the crude arylamine product of a reaction between a halogenated aromatic hydrocarbon and aqueous ammonia solution, said product also containing a relatively small amount of a phenolic compound, the steps which consist in treating said crude product with an alkali metal hydroxide in amount sufficient to convert said phenolic compound to phenate, removing water therefrom by distillation, and then distilling said arylamine from the resulting anhydrous mixture.

3. In a method of purifying the crude aniline product of the reaction between mono-chlorbenzene and aqueous ammonia solution, said product also containing a relatively small amount of phenol, the steps which consist in converting such phenol into a substantially non-hydrolyzable metallic phenate, removing water therefrom and separating said aniline by distillation from the resulting anhydrous mixture.

4. In a method of purifying the crude aniline product of the reaction between mono-chlorbenzene and aqueous ammonia solution, said product also containing a relatively small amount of phenol, the steps which consist in treating said crude aniline with an alkali metal hydroxide in amount sufficient to convert said phenol to phenate, removing water therefrom by distillation and then distilling said aniline from the resulting anhydrous mixture.

5. The method of separating an arylamine from a relatively small amount of a phenol in admixture together which comprises treating the mixture with an aqueous solution of an alkali metal hydroxide in amount sufficient to convert such phenol to phenate, removing water therefrom by distillation and then distilling said arylamine from the resulting anhydrous mixture.

6. The method of separating aniline from a relatively small amount of phenol in admixture together which comprises treating the mixture with an aqueous solution of an alkali metal hydroxide in amount sufficient to convert such phenol to phenate, removing water therefrom by distillation and then distilling said aniline from the resulting anhydrous mixture.

Signed by us this 18 day of February, 1929.

EDGAR C. BRITTON.
WILLIAM H. WILLIAMS.
MARK E. PUTNAM.